Nov. 19, 1968   E. E. WALLACE ETAL   3,411,713
MANUAL KNOB FOR CONTROLLING GAS COCK AND ADJUSTING THERMOSTAT
Filed July 22, 1966   3 Sheets-Sheet 3

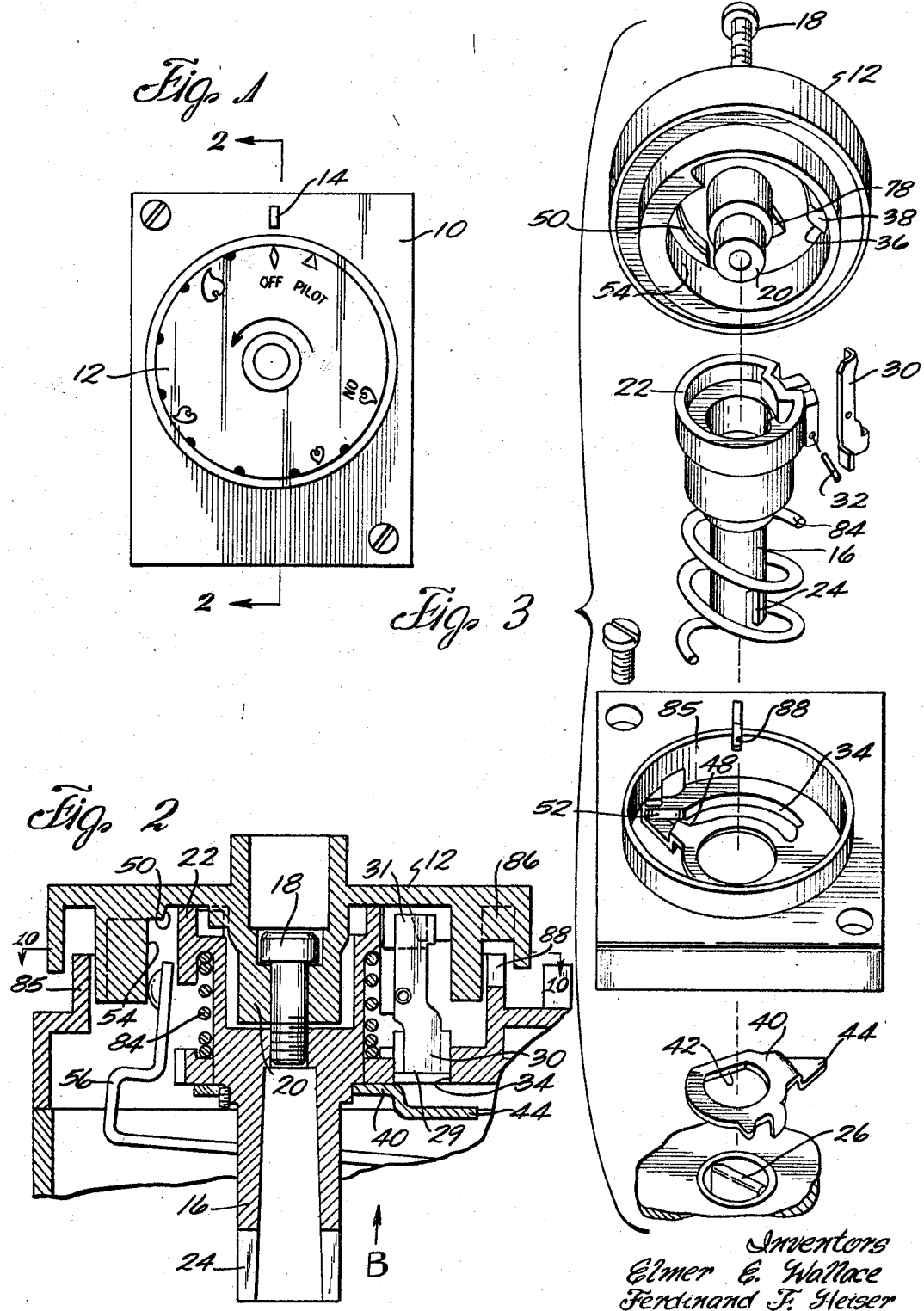

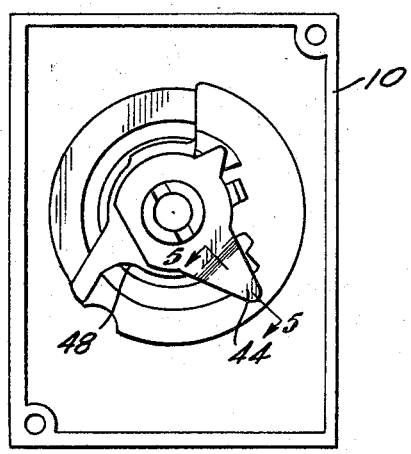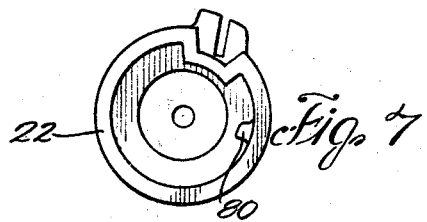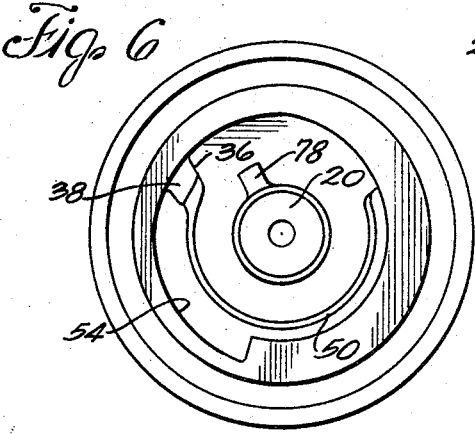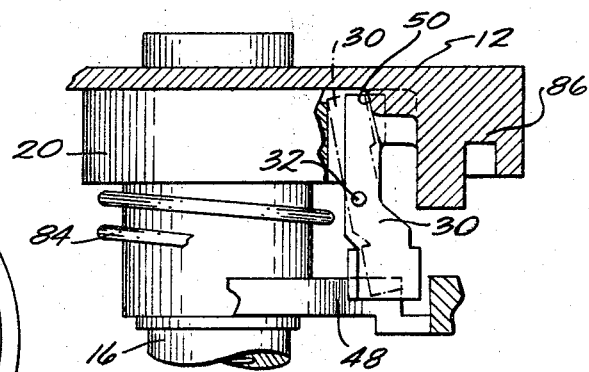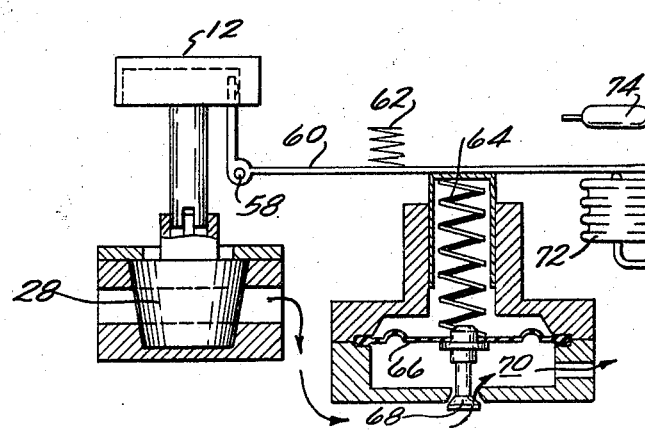

Inventors
Elmer E. Wallace
Ferdinand F. Heiser

Bayard H. Michael
Attorney

United States Patent Office 3,411,713
Patented Nov. 19, 1968

3,411,713
MANUAL KNOB FOR CONTROLLING GAS COCK
AND ADJUSTING THERMOSTAT
Elmer E. Wallace, Fullerton, and Ferdinand F. Heiser, Riverside, Calif., assignors to Controls Company of America, Melrose Park, Ill., a corporation of Delaware
Filed July 22, 1966, Ser. No. 567,114
6 Claims. (Cl. 236—99)

ABSTRACT OF THE DISCLOSURE

This invention relates to a gas control for gas heating oven and in particular to a manually operated valve mechanism having a single control knob which may be rotated between an "off," "pilot" and "on" position so as to enable resetting the safety valve.

As the knob is manually rotated between "off," "pilot," and "on" it is operatively connected to the valve to rotate the valve. The knob may be depressed in "pilot" position to reset the safety. In the range of knob movement past "on" the knob is disconnected from the valve and the cam on the knob can adjust the thermostat which controls a second valve receiving flow from the first and delivering it to the burner.

---

This invention relates to gas controls of the type having provision for selecting the temperature to be maintained in the heated medium by setting the thermostat mechanism contained in the control. More particularly, the object of this invention is to provide a single knob for carrying out all the usual functions associated with such controls—i.e. movement of the valve from "off" to "pilot" (and resetting the safety in "pilot") to "on" and then adjusting the thermostat. Heretofore gas controls of this type have required two knobs for effecting these functions, one for moving the valve from "off" to "pilot" to "on" and the other for adjusting the thermostat.

Other objects and advantages will be pointed out in, or be apparent from, the specification and claims, as will obvious modifications of the single embodiment shown in the drawings in which:

FIG. 1 is a general view of the face of a control provided with a knob according to the present invention;

FIG. 2 is a section taken as indicated by line 2—2 on FIG. 1;

FIG. 3 is an exploded perspective view of the knob;

FIG. 4 is a view from below the knob as seen in FIG. 2;

FIG. 5 is a fragmentary section taken as indicated by line 5—5 on FIG. 4;

FIG. 6 is a view taken from below the outer knob;

FIG. 7 is a view of the inner knob or valve driver as viewed from above;

FIG. 8 is a vertical elevation partly in section and with parts broken away to show the two positions of the drive lever carried by the inner knob;

FIG. 9 is a schematic view showing one way the knob and associated structure can be used to adjust a valve;

Figure 13:
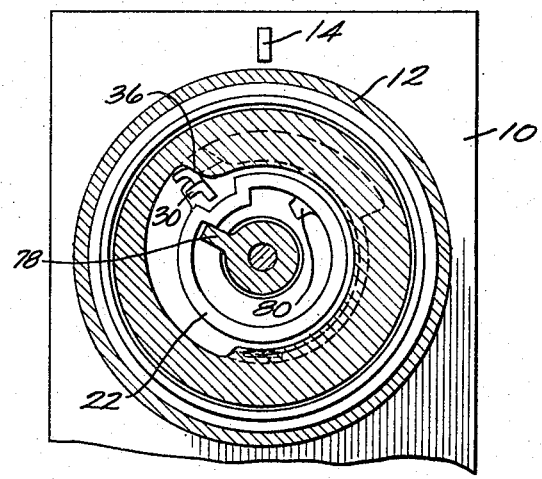

In FIG. 13 the knob has been returned to the low temperature position; and

Figure 14:
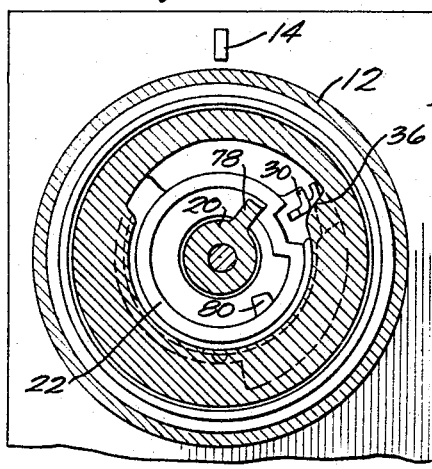

FIG. 14 shows the knob just returned to the "off" position.

Considering the drawings now in detail, the control or gas valve body 10 is fitted with a knob 12 bearing indicia cooperating with the fixed mark 14 to indicate the setting of the control. As illustrated in FIG. 1, the "off" indicia cooperates with the mark on the valve body and the gas flow through the control is completely shut off. In the "pilot" position of the knob 12 the knob can be depressed to reset the thermoelectric safety in a well known manner. From this position the knob can be turned to the "on" position and, assuming that suitable flow has been established to the pilot burner and assuming the thermocouple has functioned to energize the electromagnet to hold the safety valve mechanism open, full flow will now be permitted to the main burner. This, however, will be dependent upon the setting of the thermostat and the temperature of the heated medium. In the knob position nearest "on" the setting corresponds to the lowest temperature. Further counterclockwise rotation of the knob to the full limit of its movement will set the thermostat to its highest temperature. Rotation of the knob from "on" to the high temperature setting does not affect the position of the gas cock which remains in its "on" position. As the knob is rotated back towards the low temperature and the "on" position the gas cock is unaffected but at the "on" position continued rotation toward "off" serves to pick up the inner knob or valve driver and return the gas cock to the "off" position. Thus the present knob accomplishes the functions heretofore requiring two knobs, mainly control of the gas cock and adjustment of the thermostat.

The knob 12 is connected to the inner knob or driver 16 by means of screw 18 which could be a rivet connection. The shank of the screw or rivet 18 passes somewhat loosely through the central boss portion 20 of the knob so that the knob can rotate with respect to the screw and with respect to the valve driver 16, having bearing surfaces between the underside of the knob 12 and the upstanding flange portion 22 of the valve driver. Therefore, absent some means of interconnecting the knob and the valve driver the knob would turn loosely with respect to the valve driver. It will be noted the lower end of the driver 16 is provided with diametrically opposed vertical slots 24 which connect to the upper end of key 26 which can be carried directly by the valve or can serve as an intermediate connecting means permitting, however, the knob assembly to be moved vertically with respect thereto without affecting the position or orientation of the valve cock 28.

The valve driver 16 is provided with a lever 30 carried on pivot pin 32 and if this lever is positioned to be engaged by a driving surface on the underside of knob 12 the driving force from the knob can be transmitted to the valve driver and the valve. The lower end of the lever 30 rides in the track or groove 34 cast into the top surface of the valve body, seen best in FIG. 3. When moving the knob from the "off" position in the counterclockwise direction the upper end of the lever 30 is engaged by the drive face 36 of boss 38 cast on the underside of the knob. Thus, as the knob is moved towards the "on" position the driving force is transmitted from the knob through the drive face 36 of the boss 38 to the upper end of the lever and thence to the valve driver and the valve.

It will be noted that there is a reset member 40 staked on the drive member and positioned by reason of the D-shaped aperture 42 so as to properly orient the projecting finger 44 so that it will overlie the reset device 46 in the "pilot" position only. In the "pilot" position the knob can be depressed to actuate the reset device 46 by finger 44. This reset device is, of course, connected to the electromagnet to move the armature to the electromagnet in the usual manner and at the same time open the safety valve to be retained in the open position by the electromagnet if properly energized by the thermocouple, all as is well known in this art.

Figure 10:
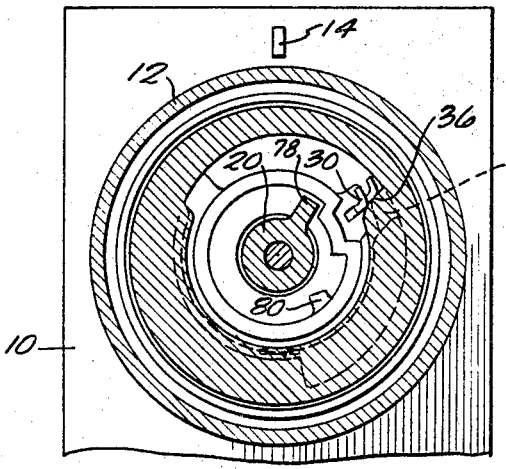
FIG. 10 is a meandering section indicated generally by line 10—10 on FIG. 2 to show the knob in the "off" position just as it starts to rotate towards the "pilot" and "on" positions.
Figure 11:
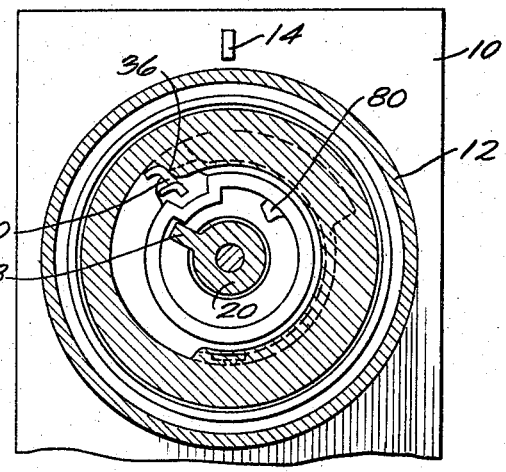
FIG. 11 shows the knob at the "on" position and where the drive lever is moved or cammed to disconnect the knob from the valve driver or inner knob.

When the knob reaches the "on" position of the gas cock 28 the lower end 29 of the lever will strike the ramp surface 48 at the left end (FIG. 3) of the guide slot 34 to force the lower end 29 of the lever outwardly and thus retract the upper end 31 of the lever from the drive face 36. FIG. 11 shows the upper end 31 retracted from the drive face. At this point no drive force can be transmitted from the outer knob 12 to the inner knob or drive member 16 through the lever. The underside of the knob is provided with a boss having a slightly inclined face 50 against which the upper end of the lever will ride during continued movement of the knob to merely keep the lever in its tilted position. This is shown in the phantom lines in FIG. 8 while the solid lines in FIG. 8 show the knob in its normal drive position. Movement of the knob back towards the "on" and ultimately the "off" position will cause the lower end 29 of the lever 30 to now strike the angled face 52 to force the lever back into the groove or slot 34 and return it to its vertical position.

When the lever has been moved out of the drive position as it goes to the full "on" position the outer knob no longer can drive the inner knob or the valve driver 16.

The gas cock is then in its "on" position. The gas cock can be positively limited to movement between "off" and "on" or it can be frictionally retained in the "on" position while continued movement of the knob sets the thermostat. For this purpose the underside of the knob is provided with an eccentric or cam surface 54 against which the cam follower 56 can ride. This can be schematically shown as illustrated in FIG. 9 where the cam follower 56 rides against the surface 54 to rock about its pivot 58. It will be noted that the lever 60 is biased by spring 62 to urge the follower against the cam surface 54. The cam surface acts on lever 60 to change the force of spring 64 acting on diaphragm 66 which carries valve 68 controlling flow into pressure chamber 70. As the force of the spring 64 increases the pressure in chamber 70 necessary to close the valve will be increased. The thermostat is schematically shown as a bellows 72 having a feeler bulb 74 connected thereto by capillary tube 76. As the temperature about the feeler bulb 74 increases the bellows will tend to expand and move the lever about its pivot 58 to decrease the force of the diaphragm spring 64 and allow a lesser pressure to close the valve 68. The particular pressure regulator valve arrangement shown is useful as the pilot valve in the bleed line controlling a main valve by the principles shown, for example, in Levine U.S. Pat. No. 2,247,060. It will be understood, however, that by changing the linkage any suitable valve operation can be achieved by this means with the thermostat operating to modify the setting in accordance with the illustrated principles or other well known in the art.

Figure 12:
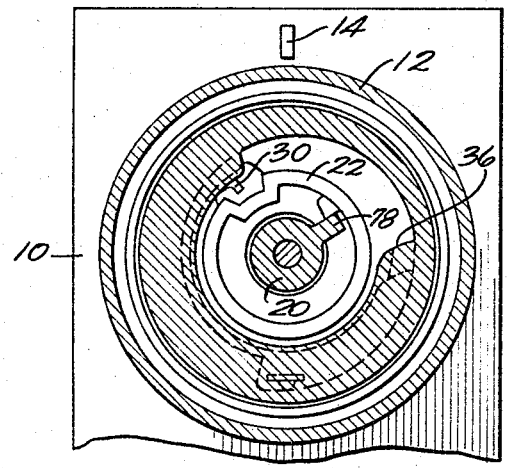
FIG. 12 shows the outer knob rotated to the highest temperature setting of the thermostat.

When the valve has been moved to the high temperature setting shown in FIG. 12 the spring force of spring 66 is at its greatest. As the outer knob is moved back towards the lowest thermostat setting the cam acts to move the follower 54 to reduce the force of the spring and, hence, reduce the flow of gas. This also acts to reduce the amount of force necessary in the bellows to close the valve 68. It is to be noted in FIG. 12 that drive boss 78 on the underside of the knob 12 has moved up against the stop boss 80 on the inside of the valve driver 16. This determines the full limit of travel in the counterclockwise direction of knob 12. As the knob is now returned towards the "off" position drive boss 78 rotates to the position shown in FIG. 13 where it picks up the surface 82 carried on the inside of the valve driver 16. Now the force is transmitted from the knob through boss 78 to drive surface 82 to rotate the valve driver in the closing direction as the knob continues rotation until the "off" position is again reached as shown in FIG. 14. It is to be noted that in the movement from "off" to "on" the force is transmitted from the knob through the drive lever 30 while the drive is transmitted from the knob to the valve driver through engagement of boss 78 with drive surface 82 when going from "on" to "off." Lever 30 is forced back into its operative position by ramp 52 at the "on" position.

The outer and inner knobs 12 and 16 are mounted for axial movement against the bias of the spring 84 for the purpose of permitting the knob assembly to be depressed in the "pilot" position for the resetting operation. The knob can be moved in the reset position only in the "pilot" position by reason of the upstanding collar 84 cooperating with the depending finger or lug 86 to prevent resetting movement of the knob in all positions except for the one position in which the notch 88 in the collar 84 is underneath the lug and now will permit resetting motion of the knob assembly.

Summarizing the foregoing, the knob 12 is connected to the valve driver or inner knob 16 by lever 30 as the knob is rotated from "off" to "on." In the "on" position the lower end 29 of lever 30 is cammed by the track face 48 to disengage lever 30 from the face 36 of boss 38 on the underside of the knob. This disconnects the knob from the valve and the thermostat adjusting cam 54 can now act to adjust the thermostat until the end of knob travel is reached as determined by engagement of knob boss 78 with limit face 80 on the inner knob which is prevented from further travel. As the knob is returned to "on" the knob boss 78 picks up the inner knob boss 82 to drive the valve towards "off." At the "on" position the lower end 29 of lever 30 strikes face 52 on the control body to lead the lower end of the lever back into track 34 and thus restore the lever to position to act as the drive connection between the knob and the valve driver in the valve opening direction.

Although but a single embodiment of the present invention has been illustrated and described, it will be apparent to those skilled in the art that various changes and modifications may be made therein without departing from the spirit of the invention or from the scope of the appended claims.

We claim:
1. An assembly comprising
   a valve movable between "off," "pilot," and "on" positions and including a drive member therefor,
   a second valve,
   thermostat means for regulating the second valve,
   a manually operable knob operative to position the first valve,
   adjusting means carried by the knob,
   drive means operatively connecting the knob and said first valve only in a first portion of the range of movement of the knob and including
      a coupling device interconnecting the knob and drive member through said first portion and being operative only when the knob is moving the first valve towards the "on" position,
      means for disengaging the coupling device when the first valve reaches said "on" position,
      interengaging surfaces on the drive member and the knob to provide a one way drive from the knob to the drive member as the knob moves in said first portion from "on" to "off,"
   means connecting the thermostat means and the adjusting means and effective to adjust the thermostat means only when the first valve is in the "on" position in the remaining portion of the range of movement of the knob.

2. An assembly according to claim 1 including a fixed surface engageable by the coupling device and to move the coupling device to its inoperative position when the first valve reaches the "on" position.

3. An assembly according to claim 2 including a second fixed surface engageable by the coupling device when the knob starts to drive the drive member through the interengaging surfaces to move the coupling device into position to be operative when the knob is turned towards the "on" position.

4. An assembly according to claim 3 in which the coupling device comprises a lever pivoted on the drive member with one end engageable by the knob and the other end engageable by said fixed surfaces.

5. An assembly according to claim 4 in which said adjusting means comprises a cam surface and the means connecting the thermostat means and the adjusting means includes a cam follower.

6. An assembly according to claim 5 in which the knob is axially movable in the "pilot" position.

References Cited

UNITED STATES PATENTS

| | | | |
|---|---|---|---|
| 2,729,285 | 1/1956 | Ray | 158—130 X |
| 2,845,228 | 7/1958 | Kile et al. | 236—99 |
| 3,011,721 | 12/1961 | Wiltz | 236—15 X |
| 3,236,448 | 2/1966 | Willson | 236—15 |

ROBERT A. O'LEARY, *Primary Examiner.*

WILLIAM E. WAYNER, *Assistant Examiner.*